United States Patent
Hardy et al.

(10) Patent No.: US 7,851,522 B2
(45) Date of Patent: Dec. 14, 2010

(54) ADHESIVE

(75) Inventors: Cordell M. Hardy, Roseville, MN (US); Mark E. Fagan, Loveland, OH (US); Scott D. Pearson, Woodbury, MN (US); Kurt C. Melancon, White Bear Lake, MN (US); Matthew T. Scholz, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 979 days.

(21) Appl. No.: 11/265,911

(22) Filed: Nov. 3, 2005

(65) Prior Publication Data

US 2006/0118005 A1  Jun. 8, 2006

Related U.S. Application Data

(60) Provisional application No. 60/634,184, filed on Dec. 8, 2004.

(51) Int. Cl.
*C08L 1/08* (2006.01)
*C08J 3/02* (2006.01)
*C04B 24/26* (2006.01)
*B32B 27/30* (2006.01)

(52) U.S. Cl. .................. 524/36; 524/563; 524/501; 442/174

(58) Field of Classification Search .............. 524/36, 524/563, 501; 442/174
See application file for complete search history.

(56) References Cited

U.S. PATENT DOCUMENTS

| 4,616,074 A | 10/1986 | Ruffner |
| 4,931,282 A | 6/1990 | Asmus et al. |
| 5,225,473 A | 7/1993 | Duan |
| 6,123,933 A | 9/2000 | Hayama et al. |
| 6,590,051 B1 | 7/2003 | Carter et al. |
| 6,602,303 B2 | 8/2003 | Laurent et al. |
| 7,348,378 B2 * | 3/2008 | Melancon et al. ........... 524/563 |
| 2003/0044535 A1 * | 3/2003 | Goobich ..................... 427/256 |
| 2003/0215418 A1 * | 11/2003 | Asmus et al. ............ 424/78.35 |
| 2004/0052746 A1 | 3/2004 | Tamareselvy et al. |
| 2005/0137320 A1 | 6/2005 | Melancon et al. |

FOREIGN PATENT DOCUMENTS

| EP | 0 098 091 | * | 1/1984 |
| GB | 2 293 605 A | | 9/1995 |
| JP | 10-36798 | | 2/1998 |
| WO | WO 96/13559 | | 5/1996 |
| WO | WO 99/62445 | | 12/1999 |
| WO | WO 01/76543 A1 | | 10/2001 |

* cited by examiner

*Primary Examiner*—William K Cheung
(74) *Attorney, Agent, or Firm*—Lisa P. Fulton (57) ABSTRACT

An aqueous adhesive composition includes a polymer adhesive material having a pH of less than 7, a cationic thickener or an anionic thickener formed from at least one anionic monomer having a pKa of less than 3, and water. The adhesive composition has a stringing length of 9 cm or less and a sag distance of 10 mm or less.

27 Claims, 1 Drawing Sheet

*Fig. 1*

ADHESIVE

CROSS-REFERENCE TO RELATED APPLICATION

This application claims the benefit of U.S. Provisional Patent Application No. 60/634,184, filed Dec. 8, 2004.

BACKGROUND

This invention relates to improved adhesives. Specifically, the invention relates to improved adhesives that exhibit improved dispensability properties.

Typical consumer adhesives or white glues are formulated at 35 to 60 percent solids and have a viscosity ranging from 2,000 to 300,000 cP as measured by on a Brookfield viscometer. These adhesives or white glues have a variety of shortcomings such as, for example, regardless of viscosity, the glues run or sag when applied to a vertical surface. In addition, these glues suffer from imprecise dispensability. Low viscosity glues are excessively runny and high viscosity glues are excessively stringy.

In general, the more viscous glues tend to be slow to "set" and are difficult to obtain in thin sections since they do not spread easily under modest stress. Thick glue sections can be undesirable since upon drying, they exacerbate curl and cockle effects in paper substrates. Thus, there is a need for an improved adhesive.

SUMMARY

Generally, the present invention relates to improved adhesives, their manufacture, and apparatus for dispensing the improved adhesive.

In an illustrative embodiment, an aqueous adhesive composition includes a polymer adhesive material having a pH of less than 7, a cationic thickener or an anionic thickener formed from at least one anionic monomer having a pKa of less than 3, and water. The adhesive composition has a stringing length of 9 cm or less and a sag distance of 10 mm or less.

In an illustrative embodiment, an aqueous adhesive composition includes a polymer adhesive material having a pH of less than 7, a cationic thickener or an anionic thickener formed from at least one anionic monomer having a pKa of less than 3, and water. The adhesive composition has a phase lag of 30 degrees or less.

In an illustrative embodiment, an aqueous adhesive composition includes a polymer adhesive material having a pH of less than 7, a cationic thickener or an anionic thickener formed from at least one anionic monomer having a pKa of less than 3, and water. The adhesive composition has a phase lag of 30 degrees or less and a sag distance of 10 mm or less.

In another illustrative embodiment, an article includes a dispenser container having a dispensing opening and an aqueous adhesive composition disposed within the dispenser container. The aqueous adhesive composition includes a polymer adhesive material having a pH of less than 7, a cationic thickener or an anionic thickener formed from at least one anionic monomer having a pKa of less than 3, and water. The adhesive composition has a phase lag of 30 degrees or less.

In another illustrative embodiment, an article includes a dispenser container having a dispensing opening and an aqueous adhesive composition disposed within the dispenser container. The aqueous adhesive composition includes a polymer adhesive material having a pH of less than 7, a cationic thickener or an anionic thickener formed from at least one anionic monomer having a pKa of less than 3, and water. The adhesive composition has a phase lag of 30 degrees or less and a sag distance of 10 mm or less.

The above summary of the present invention is not intended to describe each disclosed embodiment or every implementation of the present invention. The Figures, Detailed Description and Examples which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be applicable generally to adhesives and their manufacture, as well as apparatus for dispensing such improved adhesives.

While the present invention is not so limited, an appreciation of various aspects of the invention will be gained through a discussion of the examples provided below.

For the following defined terms, these definitions shall be applied, unless a different definition is given in the claims or elsewhere in this specification.

The term "polymer" will be understood to include polymers, copolymers (e.g., polymers formed using two or more different monomers), oligomers and combinations thereof, as well as polymers, oligomers, or copolymers that can be formed in a miscible blend by, for example, coextrusion or reaction, including transesterification. Both block and random copolymers are included, unless indicated otherwise.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

Weight percent, percent by weight, % by weight, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

The present invention provides an improved adhesive. The improved adhesive includes a polymer adhesive material, and a cationic thickener or an anionic thickener formed from at least one anionic monomer having a pKa of less than 3. The improved adhesive has one, two or more of the following physical properties: a limited stringing length; a limited phase lag; a limited sag distance; a viscosity such that the adhesive is flowable; a limited set time; and a range of complex shear modulus. Many of these properties can be determined by the methods set in the Methods section below.

The adhesive composition can have a limited stringing length. Stringing length of an adhesive can be determined by the stringing length method defined in the Methods section below. A limited stringing length can aid in precise placement of flowable adhesives. In some embodiments, the adhesive composition can have a stringing length of 0 to 9 cm, or 0 to 5 cm.

The adhesive composition can have a limited shear modulus phase lag. Shear modulus phase lag or "phase lag," can be determined by the phase lag method defined in the Methods section below. In some embodiments, the adhesive composition can have a phase lag of 0 to 45 degrees, or 0 to 30 degrees, or 0 to 20 degrees.

The adhesive composition can have a limited sag distance when placed on a vertical surface. Sag distance or sag resistance can be determined by the sag distance method defined in the Methods section below. A limited sag distance can aid in keeping adhesive on a surface where it is placed. In some embodiments, the adhesive composition can have a sag distance of 0 to 10 mm, or 0 to 5 mm, or 0 to 3 mm, or 0 to 2 mm.

The adhesive composition can have a viscosity such that the adhesive is flowable. Viscosity can be determined via a Brookfield RVT with a #6 spindle at 20 rpm at ambient conditions (23-25 degrees Celsius.) In some embodiments, the adhesive composition can have a viscosity of at least 3,000, or at least 5,000, or at least 10,000 cP. In further embodiments, the adhesive composition can have a viscosity of 100,000 cP or less, 75,000 cP or less, or 50,000 cP or less. In still further embodiments, the adhesive composition can have a viscosity in a range from 3,000 to 50,000 cP, or 3,000 to 30,000 cP, or 10,000 to 30,000 cP.

The adhesive composition can have a limited set time. Set time of the adhesive can be determined by the set time method defined in the Methods section below. In some embodiments, the adhesive composition can have a set time of 0 to 180 seconds, or 0 to 75 seconds, or 0 to 60 seconds, or 0 to 45 seconds.

The adhesive composition can have a range of complex shear modulus G*. Complex shear modulus G* can be determined by the complex shear modulus method defined in the Methods section below. In some embodiments, the adhesive composition can have a complex shear modulus G* of 50 to 1000 Pa, or 100 to 600 Pa.

In some embodiments, an aqueous adhesive composition includes a polymer adhesive material having a pH of less than 7, a cationic thickener or an anionic thickener formed from at least one anionic monomer having a pKa of less than 3, and water. The adhesive composition has a stringing length of 9 cm or less and a sag distance of 10 mm or less. In another embodiment, an aqueous adhesive composition includes a polymer adhesive material having a pH of less than 7, a cationic thickener or an anionic thickener formed from at least one anionic monomer having a pKa of less than 3, and water. The adhesive composition has a phase lag of 30 degrees or less. In a further embodiment, an aqueous adhesive composition includes a polymer adhesive material having a pH of less than 7, a cationic thickener or an anionic thickener formed from at least one anionic monomer having a pKa of less than 3, and water. The adhesive composition has a phase lag of 30 degrees or less and a sag distance of 10 mm or less. In other embodiments, two or more of the above identified physical properties can be combined, as desired.

The improved adhesive composition can be formed by combining an adhesive polymer, an ionic thickener, and water. The adhesive polymer can be a vinyl acetate polymer. The ionic thickener can be a cationic thickener or an anionic thickener formed from at least one anionic monomer having a pKa of less than 3. In some embodiments, the adhesive composition can have a glass transition temperature in a range of −60 to 100 degrees Celsius, or, −50 to 50 degrees Celsius, −20 to 30 degrees Celsius. As used herein, glass transition temperatures of the adhesive composition are taken from dried adhesive compositions. In illustrative embodiments, the adhesive composition can have a total solids content from 5 to 85 wt %, or 30 to 85 wt %, or 60 to 80 wt %, as desired.

In some illustrative embodiments, the adhesive composition can have a pH of less than 7, or 6 or less, or 5 or less, or 4 or less. In other embodiments the adhesive composition can have a pH of 2 to 6, or 3 to 6, or 4 to 6.

Vinyl acetate polymers include, for example, vinyl acetate homopolymers and vinyl acetate co-polymers such as, for example, vinyl acetate-ethylene (VAE). These vinyl acetate polymers can be combined in water to form a polymer dispersion. Vinyl acetate based polymers can be obtained by conventional emulsion polymerization and are commercially available from a variety of sources.

One or more co-monomers can be co-polymerized with vinyl acetate. In some embodiments, the vinyl acetate polymer includes vinyl acetate, ethylene, and optionally one or more other ethylenically unsaturated monomers. Illustrative examples of other ethylenically unsaturated monomers are $C_3$-$C_{10}$ alkenoic acids, such as acrylic acid, methacrylic acid, crotonic acid and isocrotonic acid and their esters with $C_1$-$C_{18}$ alkanols, such as methanol, ethanol, propanol, butanol, and 2-ethylhexanol; vinyl halides, such as vinyl chloride; alpha, beta-unsaturated $C_4$-$C_{10}$ alkenedioic acids such as maleic acid, fumaric acid, and itaconic acid and their monoesters and diesters with the same $C_1$-$C_{18}$ alkanols; and nitrogen containing monoolefinically unsaturated monomers, such as nitriles; amides; N-methylol amides; lower alkanoic acid ethers of N-methylol amides and allylcarbamates, such as acrylonitrile, acrylamide, methacrylamide, N-methylol acrylamide, N-methylol methacrylamide, N-methylol allylcarbamate, and lower alkyl ethers or lower alkanoic acid esters of N-methylol acrylamide, N-methylol methacrylamide and N-methylol allylcarbamate. Illustrative vinyl acetate-ethylene (emulsion) polymers used in this invention are commercially available products. Examples are AIRFLEX™ 320, AIRFLEX™ 323, AIRFLEX™ 400, AIRFLEX™ 400H, AIRFLEX™ 401, AIRFLEX™ 405, AIR- FLEX™ 410, AIRFLEX™ 420, AIRFLEX™ 423, AIRFLEX™ 426, AIRFLEX™ 460, AIRFLEX™ 465, AIRFLEX™ 7200, AIRFLEX™ 920, AIRFLEX™ EN421, AIRFLEX™ EP17, AIRFLEX™ 315, AIRFLEX™ 418, AIRFLEX™ EF350, and AIRFLEX™ EF940, all available from Air Products Polymers, L.P., (Allentown, Pa.) and ELVACE™ 722, ELVACE™ 725, ELVACE™ 731, ELVACE™ 732, ELVACE™ 733, ELVACE™ 734, ELVACE™ 735, ELVACE™ 736, ELVACE™ 737, ELVACE™ 739, ELVACE™ 741, and ELVACE™ 758 available from Forbo Adhesives, LLC (Durham, N.C.) and DUR-O-SET™ E-200, DUR-O-SET™ E-200, DUR-O-SET™ E-230, DUR-O-SET™ E-130, DUR-O-SET™ E-200HV, DUR-O-SET™ E-150, DUR-O-SET™ E-260, DUR-O-SET™ E-100, DUR-O-SET™ E-220, DUR-O-SET™ E-171HS, DUR-O-SET™ C-325, DUR-O-SET™ C-310, DUR-O-SET™ C-335, RESYN™ 1025, RESYN™ 1072, RESYN™ 1601, and RESYN™ SB-321 available from Vinamul Polymers, (Enoree, S.C.) and WB-3621, WB-3621 available from H.B. Fuller Co. (St Paul, Minn.). Commercially available vinyl acetate polymers, as provided, typically can have a viscosity ranging from 500 to 3000 cP.

It should be noted that when using cationic thickeners, described below, it may be preferred to use little or no monomers in the vinyl acetate adhesive polymer that are anionic at the pH employed. Anionic monomers may lead to instability by ionically interacting with the polycationic polymeric thickener. However, if the pKa of the anionic monomers in the vinyl acetate adhesive polymer is above the pH, these monomers may be compatible since they would be in the protonated form. For example, we have found that vinyl acetate polymers having alkanoic acid monomers can be successfully thickened with cationic thickeners.

Vinyl acetate polymers can be present in the adhesive compositions in any useful amount. In some embodiments, vinyl acetate polymers are present in the adhesive composition from 5 to 75 wt % or from 20 to 75 wt %, or 50 to 75 wt %, as desired.

Acid swellable thickeners generally fall into two classes: cationic thickeners and thickeners having at least one monomer having a pKa of less than 3, or less than 2.5, or less than 2. As used herein, "pKa" is defined in terms of the pKa of the monomer; once the monomer is polymerized the pKa is difficult to measure since the ions interact with one another.

The cationic polymers of this invention are selected from both permanently charged quaternary polymers (those polymers comprising quaternary amines such Polyquaternium 4, 10, 24, 32, 37 and others described below) as well as protonated primary, secondary and tertiary amine functional polymers which have been protonated with a suitable protonic acid. In one embodiment, protonated cationic polymers are based on tertiary amines. The protonated cationic polymers can be protonated with suitable acids that will not result in undue skin irritation if the user should inadvertently get the adhesive on the skin. Suitable acids include $C_1$-$C_{10}$ alkylcarboxylic acids optionally substituted by oxygen (e.g., acetic acid, alpha hydroxyacids such as lactic acid, gluconic acid, and the like), $C_1$-$C_{10}$ alkylsulfonic acids (e.g., methylsulfonic acid and ethylsulfonic acid), $C_1$-$C_{10}$ alkylhydrogensulfates (e.g., methylhydrogensulfate) and mineral acids (e.g., hydrochloric acid, hydrobromic acid, sulfuric acid, and phosphoric acid and the like). The charge on protonated cationic polymers is pH dependent. For this reason, in order to ensure the polymer is sufficiently protonated, the pH must be adjusted appropriately and should be less than the pKa of the amine. Use pH values are less than 7, or less than 6, or less than 5. It should be noted that it is not necessary to have all of the amines on a particular polymer protonated. The level of protonation will to a certain extent be pH dependent. With certain polymers, in order to obtain optimum thickening, it may be beneficial to only protonate a small percentage of the available amine groups while with other polymers it may be beneficial to protonate substantially all of the amine groups.

The quaternary, tertiary, secondary and primary amine functional polymers may be chosen from natural polymers, modified natural polymers as well as synthetic polymers. These polymers may be soluble or swellable in the aqueous adhesive dispersion. Furthermore, these polymers may also possess hydrophobic side chains and thus be associative polymers.

As used herein, a soluble polymer is one that in dilute solution (i.e. about 0.01-0.1% by weight in the desired solvent system absent any insoluble additives such as the adhesive), after heating for a sufficient time to ensure solubilization of any potentially soluble components, has no significant observable particles of greater than about 1 micron in particle size, as determined by light scattering measurements using, for example, Malvern Masterisizer E Laser Particle Size Analyzer available from Malvern Co., Boston, Mass.

As used herein, a swellable polymer is one that in dilute solution (i.e. about 0.01-0.1% by weight in the desired solvent system absent any insoluble additives such as the adhesive), after heating for a sufficient time to ensure solubilization of any potentially soluble components, has a significant (i.e., detectable) number of observable particles of greater than about 1 micron in particle size, as determined by light scattering measurements using, for example, Malvern Masterisizer E Laser Particle Size Analyzer.

As used herein, an associative polymer is one that has greater than 2 hydrophobic side chains per polymer molecule of greater than about 8 carbon atoms. In some embodiments, alkyl side chains have at least 8 carbon atoms, or at least 12, or at least 14 carbon atoms to ensure sufficient Van der Waals interactions to enhance thickening efficiency. Chain lengths may be less if perfluorinated side chains are used in place of hydrocarbon side chains.

A partial listing of suitable cationic polymers is described below. Cationic natural polymer derivatives that are soluble include cationic modified cellulosic polymers, for example. Cationic modified cellulosic polymers are reported in the literature to be soluble in water. Such polymers have been found to be useful in the present invention. Some preferred modified cellulose products are sold under the trade names "CELQUAT" (National Starch and Chemicals Corp., Bridgewater, N.J.) and "UCARE" (Amerchol Corporation, Edison, N.J.). "CELQUAT" is a copolymer of a polyethoxylated cellulose and dimethyldiallyl ammonium chloride and has the Cosmetic, Toiletry and Fragrance Association (CTFA) designation Polyquatemium-4. Suitable "CELQUAT" polymers are "CELQUAT" SC-230M and H-100. "UCARE" is a polymeric quaternary ammonium salt of hydroxyethylcellulose and a trimethyl ammonium chloride substituted epoxide and has the CTFA designation Polyquatemium-10. The "UCARE" polymers have a high degree of cationic substitution. One example of a "UCARE" polymer is "UCARE" JR-30M.

An alkyl modified quaternary ammonium salt of hydroxyethyl cellulose and a trimethyl ammonium chloride substituted epoxide has also been found to be useful. The polymer conforms to the CTFA designation Polyquatemium 24 and is commercially available as "QUATRISOFT" LM-200 from Amerchol Corp., Edison, N.J.

Cationic synthetic polymers that are soluble include synthetic cationic linear polymers, for example. Synthetic cationic linear polymers useful in the present invention are high in cationic charge density—generally having greater than 10% by weight cationic monomer, or greater than 25% by weight, or greater than 50% by weight. This ensures sufficient solubility with enhanced physical properties. In general, the polymers useful in the present invention have sufficient molecular weight to achieve thickening at generally less than about 5% by weight polymer, but not too high that the adhesive properties such as stringing length, shear modulus phase lag, viscosity and set time as defined herein are compromised. While the composition of the polymer will affect the molecular weight at which sufficient thickening will occur, the polymers generally have a molecular weight of about 50,000 Daltons to about 3,000,000 Daltons, or about 100,000 Daltons to about 1,000,000 Daltons. The homopolymers can include one of the following monomers: methacryloyloxyalkyl trialkyl ammonium salt, acryloyloxyalkyl trialkyl ammonium salt, and quaternized dialkylaminoalkylacrylamidine salt. In some embodiments, the polymers are copolymers including at least two monomers selected from the group of: trialkylaminoalkyl acrylate and methacrylate salts, dialkyldiallyl ammonium salts, acrylamidoalkyltrialkyl salts, methacrylamidoalkyltrialkyl salts, and alkyl imidazolinium salts, N-vinyl pyrrolidinone, N-vinyl caprolactam, methyl vinyl ether, acrylates, methacrylates, styrene, and acrylonitrile. The salt counterions can include, but are not limited to, $F^-$, $Cl^-$, $Br^-$, and $CH_3(CH_2)_n SO_4^-$ where n=0-4, and conjugate bases of suitable acids described above.

A variety of quaternary copolymers of varying quaternization can be synthesized based on homo or copolymers of amino acrylates with methyl, ethyl or propyl side chains. These monomers could also be copolymerized with other nonionic monomers including quaternary acrylic homopolymers, such as homopolymers of 2-methacryloxyethyl trimethylammonium chloride and 2-methacryloxyethyl methyl diethyl ammonium bromide; and copolymers of quaternary acrylate monomers with water-soluble monomers.

Another useful soluble cationic polymer is N,N-dimethylaminopropyl-N-acrylamidine (which is quaternized with diethylsulfate) bound to a block of polyacrylonitrile. This block copolymer is available as "Hypan QT-100" from Lipo Chemicals Inc., Paterson, N.J.

Many swellable polymers, which are slightly crosslinked, function as viscosifiers in the adhesive systems. In general, these swellable polymers tend to be less stringy. Excessive crosslinking can result in polymers that do not swell sufficiently to increase the viscosity of the composition. In order to ensure adequate swelling, if a chemical crosslinker is used, the concentration of crosslinker is quite low, e.g., less than about 1000 ppm, or less than 500 ppm, based on the weight of the dry polymer.

A class of crosslinked polymers suitable for use in this invention includes acrylamide and at least one other quaternary monomer selected from the group of trialkylaminoalkylacrylate and methacrylate salts, dialkyldiallyl ammonium salts, acrylamidoalkyltrialkyl ammonium salts, methacrylamidoalkyltrialkyl ammonium salts, and monomers including imidazolinium salts. The counterions can include, for example, $F^-$, $Cl^-$, $Br^-$, and $CH_3 (CH_2)_r SO_4^-$ where n=0-4, and conjugate bases of suitable acids described above. Other comonomers may also be added including N-vinyl pyrrolidone, N-vinyl caprolactam, methyl vinyl ether, acrylates, methacrylates, styrene, and the like. In one embodiment, the polymer includes poly(2-methacryloxyethyl trimethyl ammonium chloride) polydimethylaminoethyl methacrylate, which conforms to the CTFA designation Polyquatemium 37. In another embodiment, the polymer includes acrylamide and methacryloyloxyethyl trimethyl ammonium chloride, which conforms to the CTFA designation Polyquatemium 32. These are commercially available from Ciba Specialty Chemicals (Basel, Switzerland) as "SALCARE" SC95, SC96, and SC92.

Other swellable polymers (i.e., slightly crosslinked polymers) can be prepared using ionizing radiation to crosslink. For examples, polymers comprising N-vinyl lactams, such as N-vinyl pyrrolidone, when exposed to gamma radiation increase in molecular weight and may actually crosslink. This crosslinking allows for more efficient thickening (less polymer required to achieve a certain viscosity) and an improved feel. Other polymers, that when exposed to gamma radiation result in crosslinking, include polymers such as "LUVIQUAT HM 552" (copolymers of vinylimidazolium methochloride and vinylpyrrolidone, which conforms to the CTFA designation Polyquaternium-16), and "GAFQUAT HS-100" (vinylpyrrolidone/methacrylamidopropyltrimethylammonium chloride copolymer which conforms to the CTFA designation Polyquatemium-28).

Chemical crosslinking using polyunsaturated monomers such as diallyl maleate may also prove useful. Other suitable crosslinkers are multi-ethylenically unsaturated compounds wherein the ethylenic groups are vinyl groups (including substituted vinyl groups, such as isopropenyl groups), allyl groups, and/or methallyl groups, which groups are bonded to nitrogen or oxygen atoms. Vinyl, allyl, and methallyl groups as used herein include substituted derivatives. Exemplary compounds include divinyl, diallyl, or dimethallyl esters, ethers, amides, or ureas. Specific examples are disclosed in U.S. Pat. No. 5,225,473 (Duan) and U.S. Pat. No. 4,931,282 (Asmus et al.).

A range of crosslinked polyvinylpyrrolidone (PVP) materials have been prepared via covalent crosslinking with diallyl maleate or by radiation crosslinking of linear PVP powders. Crosslinked PVP prepared under these techniques can produce colloidal particles which are highly swellable in aqueous solutions and thereby produce viscous solutions. The polymers are also nonionic and have excellent compatibility with many adhesives.

Associative polymers can be used in the thickening system of the compositions of the present invention. Such polymers are believed to thicken as a result of hydrophobic or Van de Waals association of hydrophobic side chains. Such associative polymers can form viscous to gelled aqueous solutions despite their relatively low molecular weights. Polymers that are water soluble can be modified by the addition of a long chain hydrophobic group.

One class of associative polymers is based on copolymers including at least one aminoacrylate monomer and at least one monomer having at least 12 or at least 14 carbon atoms. One commercially available example is an acrylate/aminoacrylate/($C_{10}$-$C_{30}$)alkyl PEG-20 itaconate copolymer available as "STRUCTURE PLUS™" from National Starch.

Another class of associative polymers is based on nonionic ethylenically unsaturated monomers wherein at least one comonomer has at least 12, or at least 14 carbon atoms. One example is cetyl hydroxyethylcellulose, available as "NATROSOL PLUS" from Aqualon, which utilizes an associative mechanism to enhance the viscosity it produces. Grafted side chains of cetyl alkyl groups can associate with neighboring alkyl hydrophobes. These interpolymer associations can increase the viscosification efficiency of the polymer.

Other cationic polymers include amine oxide polymers such as those described in U.S. Pat. No. 6,123,933 and those commercially available under the trade designation DIAFORMER Z-711, Z-712, Z-731, and Z-751 from Clariant Corp. are useful. These polymers will include a net cationic charge under acidic conditions. Additionally, zwitterionic polymers, such as methacryloyl ethyl betaine/acrylate copolymer that are commercially available under the trade designation DIAFORMER Z-400 from Clariant Corp. can also be used. Zwitterionic polymers described in U.S. Pat. No. 6,590,051 may also be useful.

Anionic thickeners useful in this invention have at least one monomer having at least one anionic group having a pKa of less than 3, or less than 2.5, or less than 2. In this manner, at acidic pH values less than 5 and even at pH values as low as 3 substantial numbers of the groups will remain ionized. In general, the minimum pH of adhesive compositions thickened with the low pKa monomer containing polymers is at least 0.5 units or at least 1 unit higher than the pKa to ensure sufficient ionization.

Suitable polymers of this class are those based on phosphonic acid, or sulfonic acid functional monomers. These monomers have pKa values of less than 2. Importantly carboxylic acid functional monomers have pKa values greater than 3 and thus do not thicken as well (or at all) at low pH values. Suitable ionic polymeric thickeners of this invention, include but are not limited to, polymers derived from sodium AMPS (the sodium salt of 2-acrylamido-2-methylpropane sulfonic acid), sulfopropyl acrylate or methacrylate, sulphomethylated acrylamide, allyl sulphonate, sodium vinyl sulphonate, vinyl phosphonic acid combinations thereof, or other water-soluble forms of these or other polymerizable phosphonic or sulphonic acids. Polymers comprising sulfate and phosphate groups also may be useful.

These low pKa monomers may be copolymerized with other ethylenically unsaturated monomers such as $C_3$-$C_{10}$ alkenoic acids, such as acrylic acid, methacrylic acid, crotonic acid and isocrotonic acid and their esters with $C_1$-$C_{30}$ alkanols, such as methanol, ethanol, propanol, butanol, 2-ethylhexanol, stearyl alcohol, and behenyl alcohol as well as alkoxylated alkanols such as polyethoxylated lauryl, stearyl, and behenyl alcohol having 1-100 moles of ethylene oxide; vinyl halides, such as vinyl chloride; alpha, beta-unsaturated $C_4$-$C_{10}$ alkenedioic acids such as maleic acid, fumaric acid, and itaconic acid and their monoesters and diesters with the same $C_1$-$C_{18}$ alkanols; and nitrogen containing monoolefinically unsaturated monomers, such as nitriles; amides; N-methylol amides; lower alkanoic acid ethers of N-methylol amides and allylcarbamates, such as acrylonitrile, acrylamide, methacrylamide, N-methylol acrylamide, N-methylol methacrylamide, N-methylol allylcarbamate, and lower alkyl ethers or lower alkanoic acid esters of N-methylol acrylamide, N-methylol methacrylamide and N-methylol allylcarbamate. Also useful as comonomers are n-vinyl lactams such as N-vinylpyrrolidone, and N-vinylcaprolactam, styrene, alkoxylated monomers, hydrophobic side chain containing momomers and the like. Examples of anionic thickeners include, for example, ARISTOFLEX AVC (ammonium acryloyldimethyltuarate/vinyl pyrrolidone copolymer) and ARISTOFLEX HMB (ammonium acrylolydimethyltuarate/beheneth-25 methacrylate copolymer) both available from Clariant Corp. Mt. Holly, N.C.

The ionic thickeners can be present in the adhesive compositions in any useful amount. In some embodiments, acid swellable thickeners are present in the adhesive composition from 0.01 to 10 wt %, or from 0.01 to 5 wt %, or 0.01 to 3 wt %, or from 0.1 to 10 wt %, or from 0.1 to 5 wt %, or 0.1 to 3 wt %, as desired.

The adhesive compositions of the invention can optionally include fillers. Fillers can be organic or inorganic fillers and can be present in the adhesive in any useful amount. Fillers can be any organic or inorganic additives such as, for example, antioxidants, stabilizers, antiozonants, plasticizers, dyes, U.V. absorbers, HALS, tackifiers, and pigments. Antimicrobial agents may also be added to prevent mold growth and the like. The adhesive compositions of the invention can optionally include colorants, such as pigments or dyes, to provide a tint or color to the adhesive composition as well as fluorescent brightening agents.

Figure 1:
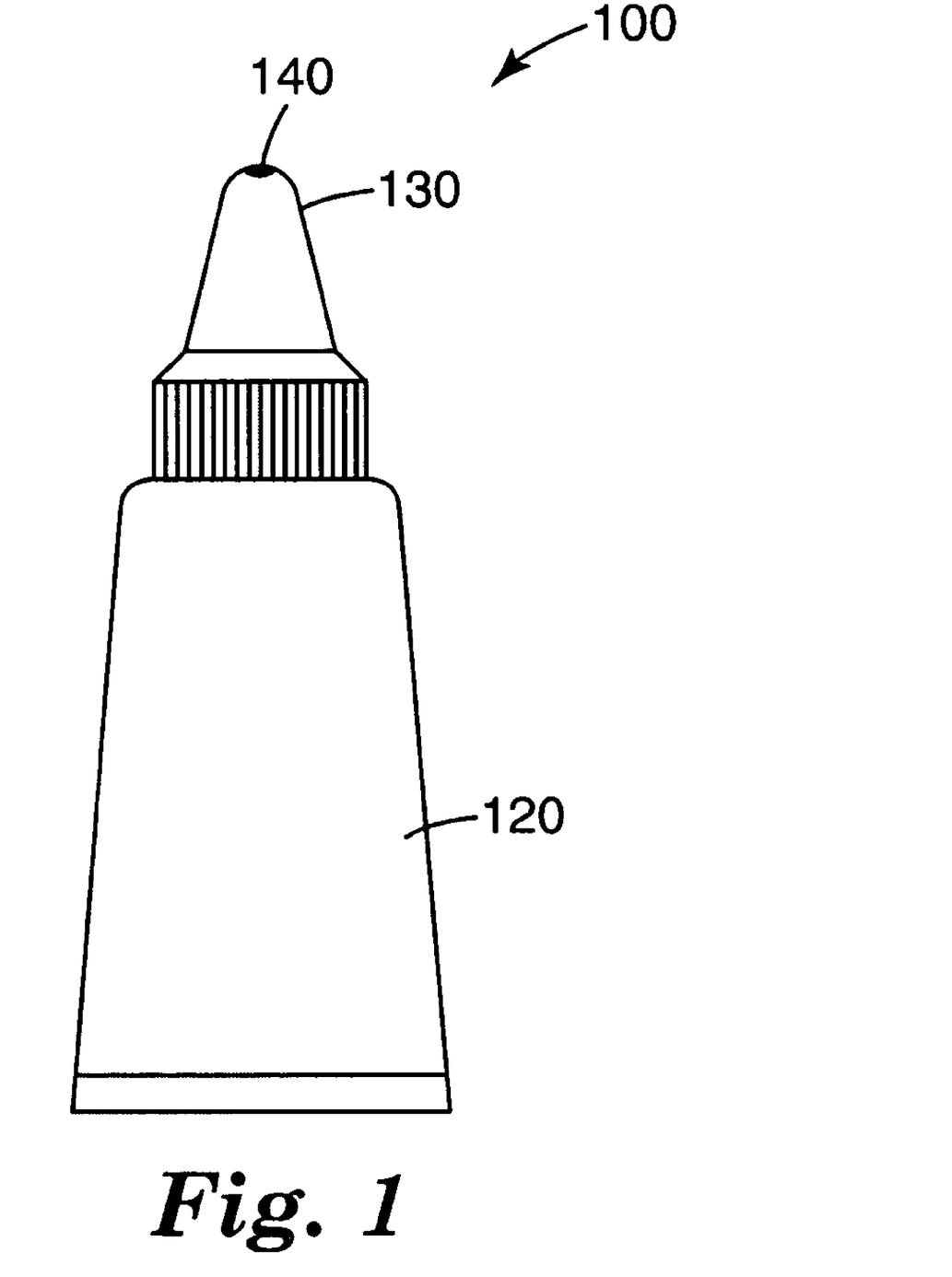
FIG. 1 is a schematic view of an illustrative adhesive dispenser.

FIG. 1 shows an illustrative adhesive dispenser 100 that can hold and dispense the improved adhesive described herein. The dispenser 100 can include an adhesive containing portion 120 that contains the adhesive prior to being dispensed. In some embodiments, the containing portion 120 is formed of a flexible material such as a polymeric material. The dispenser can contain any useful amount of adhesive such as, for example, 0.5 to 5000 ml, or 0.5 to 1000 ml, or 50 to 500 ml. The dispenser 100 can include a dispensing portion 130 disposed on the containing portion 120. The dispensing portion 130 can include a dispenser opening 140. In one embodiment, adhesive can be dispensed by a user by the user applying finger pressure to the flexible containing portion 120 which urges adhesive material toward and through the dispenser opening 140 to the application target. In some embodiments, the dispenser opening 140 has an area in a range of 0.05 to 50 $mm^2$, 0.1 to 30 $mm^2$, 0.1 to 10 $mm^2$, 0.2 to 1.8 $mm^2$, 0.5 to 1.5 $mm^2$, or 0.75 to 1.25 $mm^2$, as desired.

The adhesive compositions described herein are easily and precisely dispensed from a fine tipped applicator using only hand pressure to apply. The combination of adhesive rheology and fine tipped dispensers provides excellent control during adhesive dispensing and allows the user to effortlessly apply the adhesive in any shape desired (fine or coarse dots, streaks, lines, etc). The adhesive rheology can also assist in the creation of thin bond lines due to the ease with which the adhesive spreads when compressed lightly between adherents with modest lamination pressure, e.g., light hand pressure used to laminate paper card stock together. In addition the rheology provided by cationic thickened adhesive polymers described herein also minimizes/eliminates the tendency of the adhesive to string or leg when applied in small drops or in a fine continuous bead, thus allowing more precise application of the adhesive.

Advantages of the invention are illustrated by the following examples. However, the particular materials and amounts thereof recited in these examples, as well as other conditions and details, are to be interpreted to apply broadly in the art and should not be construed to unduly limit the invention.

Methods

Set Time

This test involves the following steps:
1. Coat a stripe (5-10 cm wide) of adhesive (~3 grams) onto a first sheet of test paper 6" wide IP Thilmany 50# Bleached Andro Base Paper) to obtain a 0.23 mm thick wet adhesive coating;
2. While adhesive is wet, laminate a second sheet of the test paper, which has been pre-cut into 0.5" width strips, to the first sheet of test paper;
3. Laminate the two sheets together by rolling with a 4.5 lb rubber roller; and
4. Peel the 0.5" width paper strips from the laminate at regular time intervals to determine how long it takes to develop sufficient strength to tear the test paper strip.

Sag Resistance or Distance

Adhesive sag resistance is assessed by depositing a 0.1 ml drop of adhesive near an end of a horizontally positioned 2 mil clean thick strip of poly(ethylene terephthalate) (PET) film measuring ~15 cm×25 cm.

Immediately following adhesive deposition, the PET film is positioned vertically, with the adhesive drop located at the top of sheet, which allows the adhesive to flow downward along the length of the film strip.

When adhesive flow has ceased, the distance, in millimeters (mm), the adhesive has flowed is measured and recorded. The specific distance measured is that distance from the bottom edge of the original adhesive drop, prior to orienting vertically, to the bottom most edge of the adhesive flow once the adhesive flow has ceased.

Stringing Length

This test method provides a means of assessing the extent to which an adhesive strings when dispensed. In general the test method involves dispensing glue through a vertically oriented syringe needle at fixed rate, and measuring the length of the glue fiber/strand that forms as the glue extends from the needle and falls to a stage below.

The longer the strand the higher the extent of stringing, the shorter the strand the lower the extent of stringing. This test method is conducted in a constant temperature room having temperature of 22° C. and a relative humidity of 50% and employs the following equipment.
1. Syringe pump, catalog # 55-2226, Harvard Apparatus, So Natick, Mass. 01760
2. 16 ga×38 mm PrecisionGlide™ Needle 16G 1½ disposable syringe needle, 1.19 mm ID, Becton Dickinson & Co, Franklin Lakes, N.J. 07417-1884
3. 10 ml Luer Norm-Ject disposable syringe, Henke Sass Wolf GMBH, Tuttlingen, Germany
4. Teflon tubing 3.2 mm ID×152 mm length fit with male/female Luer connections on opposite ends to provide a flexible connection between the syringe and the needle
5. Laboratory jack
6. Laboratory jack stand
7. Small laboratory clamp
8. Cylindrical sleeve constructed from 0.45 mm thick clear polycarbonate ~14 cm dia×38 cm tall and slotted appropriately to allow clearance for clamp and Teflon tubing clearance.

Equipment Preparation and Layout

The syringe/tubing/needle assembly is arranged with the syringe mounted horizontally in the syringe pump and needle oriented vertically, such that the extruded adhesive discharges straight downward from the needle tip.

The small clamp is affixed to the vertical member of the jack stand and the needle is secured with the clamp to maintain orientation during the test. The lab jack is placed on the jack stand below the needle to provide a movable stage onto which the flowing adhesive impinges. The range of lab jack motion is ~38 cm total, i.e., the jack can be elevated to touch the tip of the needle and can be lowered 38 cm below the tip of the needle.

The polycarbonate sleeve is used as a draft eliminator to reduce the effect of any air motion on the falling strand of adhesive. The sleeve is placed on the jack such that it is concentric with the circumference of the needle barrel. Two longitudinal slots are required on the sleeve to allow the sleeve to pass by the small clamp and the flexible tubing as the lab jack is raised or lowered.

The needle was shortened, using a die grinder fit with cut-off wheel, to provide a square end on the barrel of the needle and a length of 6.4 mm, i.e., 6.4 mm of needle protruded from the hub. The shortened needle barrel was deburred with 320 grit sandpaper. The square-ended needle barrel allows uniform discharge of the adhesive from the needle and minimizes any tendency for the extruded adhesive to drag or distort upon exiting the needle.

Testing Procedure

The adhesive is free of bubbles prior to performing this test. The syringe is filled with adhesive by immersing the syringe tip into the adhesive and gently withdrawing the plunger to fill the syringe. Care must be taken during this operation to avoid introducing air into the adhesive as this deleteriously affects the test outcome, i.e., air bubbles in the discharged adhesive can cause flaws in the stream that result in premature breakage of the falling stream.

The filled syringe is fit with the flexible connection tube and needle, and mounted in the syringe pump. The pump is started to provide an adhesive flow of 1.75 milliliters/minute (ml/min). The syringe needle is initially held by hand and oriented to discharge straight upward in order to purge any air from the flexible line, connections, or needle.

When a bubble free adhesive stream is observed exiting the needle the pump is stopped, the needle orientation reversed (to discharge straight down), the needle clamped in position for testing, and the jack and cylindrical sleeve placed as described above.

To run the test the stage is positioned at a distance of 2.5 cm from the needle tip, the pump started, and the adhesive stream observed. If the adhesive stream is stable and continuous the stage is slowly lowered in 1 cm increments, with a 5 second observation time required at each height, until the stream breaks. The stage is then raised until the flow reconnects to provide a continuous stream. The stage is lowered in steps to the point at which the stream breaks-off, and the distance at which a continuous flow occurred is recorded (i.e., that distance from the needle tip to the stage).

This protocol is repeated 2 more times to obtain a total of 3 separate measurements of the maximum distance at which a continuous strand could be observed. If upon starting the test the stream is discontinuous, the stage is raised to a point at which the flow connects to provide a continuous stream and the protocol described above followed to complete the test. For certain adhesives, during the course of the test, the dispensed adhesive collecting on the stage may tend to pile up, thus when recording the maximum distance at which a continuous flow occurred, any buildup on the stage must be taken into account, i.e., the build-up distance (the height from the stage to the top of the adhesive pile) subtracted from the overall measured distance. The average of the three measurements is recorded as the "Continuous Fiber Stringing Length" and reported in centimeter units. If the test is not completed with a unitary syringe filling, the test can be restarted with another syringe filling at the preceding stage height and run to completion.

Shear Modulus (Phase Lag "δ" and Complex Shear Modulus "G*")

Dynamic mechanical properties of the samples were measured with a Bohlin CVO 120 HR NF rheometer. Bohlin rheometers are available from Malvern Instruments Ltd., Enigma Business Park, Grovewood Road, Malvern, Worcestershire, United Kingdom, WR14 1XZ. All measurements were taken using the Bohlin C25 Mooney-Couette geometry at 25 degrees Celsius. A trap was placed over the top of the C25 cup to retard sample drying. Evaporation traps are available from Malvern Instruments.

The dynamic mechanical properties of interest are the complex shear modulus, G*, and the phase lag, which is also sometimes called phase shift. These two parameters are often used to describe the relationship between stress and strain for materials, and in particular for viscoelastic materials. Materials with high moduli provide greater resistance to an applied stress, resulting in smaller strains, than those with low moduli. The phase lag is, by definition, bounded between zero and 90 degrees and represents the relative levels of elastic and viscous response of the sample to the applied stress. Purely elastic (i.e., Hookean) materials have a zero degree phase lag and purely viscous materials have a 90 degree phase lag relative to the oscillatory stress.

G* and δ were measured by loading 17 grams of each sample into the rheometer. The samples were equilibrated to 25° C., sheared for 30 seconds at 50 s$^{-1}$, and then allowed to rest for 30 seconds before each test was run. Sinusoidally oscillating stresses were applied to each sample at a frequency of 1 Hz. Ten stress amplitudes, increasing logarithmically from 0.1 Pa to 100 Pa, were chosen as test conditions. The values of G* and δ at 1.7 Pa recorded by the instrument are used here.

EXAMPLES

Materials

Elvace™ 731, VAE copolymer emulsion provided at ~55% solids, pH 4-5, Forbo Adhesives, LLC, Durham, N.C.

Elvace™ 735, VAE copolymer emulsion provided at ~55% solids, pH 4-5, Forbo Adhesives, LLC, Durham, N.C.

Resyn™ 1025, VA homopolymer emulsion provided at ~55% solids, pH 4-5, Vinamul Polymers, Bridgewater, N.J.

Structure Plus™ is an acrylates/aminoacrylate/C$_{10-30}$alkyl PEG-20 itaconate copolymer, National Starch and Chemical Co., Bridgewater, N.J.

Aristoflex™ HMB is an ammonium acrylodimethyltaruate/beheneth-25 methacrylate crosspolymer, Clariant Inc., Muttenz, Switzerland.

Aristoflex™ AVC is an ammonium acryloyldimethyltaurate/vinyl pyrrolidone copolymer, Clariant Inc., Muttenz, Switzerland.

Salcare™ SC92 is an acrylamide/methacryloyloxyethyltrimethylammonium chloride crosslinked copolymer in mineral oil, ~50% solids, Ciba Specialty Chemicals, Basel, Switzerland.

Salcare™ SC95 is a methylene chloride quaternary ammonium salt of dimethylaminoethylmethacrylate in mineral oil, ~50% solids, Ciba Specialty Chemicals, Basel, Switzerland.

Rheovis™ CDE is a 50% solids, cationic, acrylamide-free acrylic polymer at 50% solids. Ciba Specialty Chemicals, Basel Switzerland.

Sepigal™ 305 is polyacrylamide and isoparaffin and laureth-7, Seppic, Paris, France.

Glycolic Acid, Aldrich Chemical Co, Milwaukee, Wis.

Aleene's Fast Grab Tacky Glue™, Duncan Enterprises, Fresno, Calif.

Aleene's Original Tacky Glue™, Duncan Enterprises, Fresno, Calif.

Aleene's Quick Dry Tacky Glue™, Duncan Enterprises, Fresno, Calif.

Elmer's Glue-All™, Elmer's Products, Inc., Columbus, Ohio.

General Preparation Procedure

The inventive adhesive examples described herein typically consist of an adhesive polymer, cationic thickener, and water. Such samples are prepared by combining the adhesive polymer, cationic thickener, and water in a vessel and mixing well with a motor driven marine propeller to obtain a uniform composition. Samples equilibrated for 24 hours after preparation.

Comparative Examples C1, C2, C3, C4

These Comparative Examples are commercially available materials shown in Table 1. The adhesives were characterized for Brookfield viscosity, set time, stringing, and rheology according to the test methods set forth above. The results are reported in Table 5.

TABLE 1

| Example | Adhesive |
|---------|----------|
| C1 | Elvace ™ 731 |
| C2 | Elvace ™ 735 |
| C3 | Resyn ™ 1025 |

Examples 1, 2, 3, 4, 5, 6, 7, 8

These Examples were prepared by the foregoing procedure and consisted of the materials and quantities (in pph) shown in Table 2. The unit "pph" refers to parts by weight per 100 parts by weight of polymer as commercially provided. The resulting adhesives were characterized for Brookfield viscosity, set time, stringing, and rheology according to the test methods set forth above. The results are reported in Table 5.

TABLE 2

| Example | Adhesive | Structure Plus (pph) | Glycolic Acid (pph) |
|---------|----------|----------------------|---------------------|
| 1 | Elvace ™ 731 | 1 | — |
| 2 | Elvace ™ 735 | 1 | — |
| 3 | Resyn ™ 1025 | 1 | — |
| 4 | Resyn ™ 1025 | 2 | — |
| 5 | Elvace ™ 731 | 0.4 | — |
| 6 | 75% Elvace ™ 731 25% water | 8.9 | 1 |
| 7 | 50% Elvace ™ 731 50% water | 11.3 | 1 |
| 8 | 25% Elvace ™ 731 75% water | 13.3 | 1 |

Comparative Examples C4, C5, C6, C7

This series of comparative examples consisted of common commercially available consumer white glues listed in Table 3. These Examples were characterized for Brookfield viscosity, set time, stringing, and rheology. The results are reported in Table 5.

TABLE 3

| Example | Adhesive |
|---|---|
| C4 | Aleene's Fast Grab Tacky Glue ™ |
| C5 | Aleene's Original Tacky Glue ™ |
| C6 | Aleene's Quick Dry Tacky Glue ™ |
| C7 | Elmer's Glue-All ™ |

Examples 9, 10, 11, 12, 13, 14

These Examples were prepared by the foregoing procedure and consisted of the materials and quantities (in pph) shown in Table 4. The unit "pph" refers to parts by weight per 100 parts by weight of polymer solids. The resulting adhesives were characterized for Brookfield viscosity, set time, stringing, and rheology according to the test methods set forth above. The results are reported in Table 4.

TABLE 4

| Example | Adhesive | Cationic Thickener | Thickener Amount (pph) |
|---|---|---|---|
| 9 | Elvace ™ 731 | Aristoflex ™ HMB | 0.5 |
| 10 | Elvace ™ 731 | Aristoflex ™ AVC | 0.25 |
| 11 | Elvace ™ 731 | Salcare ™ SC92 | 1 |
| 12 | Elvace ™ 731 | Salcare ™ SC95 | 1 |
| 13 | Elvace ™ 731 | Sepigel ™ 305 | 1 |
| 14 | Elvace ™ 731 | Rheovis ™ CDE | 1 |

TABLE 5

| Example | Brookfield Viscosity[1], cP | Set Time, s | Continuous Fiber Stringing Length, cm | Sag Distance Mm | Shear Modulus[2] G*, Pa 1 Hz, 1.7 Pa | Shear Modulus[2] δ, deg 1 Hz, 1.7 Pa |
|---|---|---|---|---|---|---|
| 1 | 24500 | 45 | 6 | 0 | 244 | 10 |
| 2 | 25000 | 70 | 5 | 0 | 345 | 9 |
| 3 | 12500 | 80 | 4 | 2 | 364 | 19 |
| C1 | 2500 | 45 | 1 | 62 | 16 | 32 |
| C2 | 3000 | 60 | 1 | 30 | 8 | 49 |
| C3 | 1500 | 66 | 1 | 97 | 2 | 73 |
| 4 | 13500 | 85 | 4 | 0 | 643 | 11 |
| 5 | 11500 | 45 | 3 | 5 | 81 | 15 |
| 6 | 15500 | 90 | 3 | 0 | 214 | 10 |
| 7 | 12000 | 85 | 3 | 1 | 157 | 10 |
| 8 | 10500 | 85 | 3 | 4 | 122 | 10 |
| C4 | 195000 | 68 | too visc to measure | 22 | 705 | 77 |
| C5 | 41500 | 85 | 27 | 33 | 192 | 82 |
| C6 | 8500 | 63 | 5 | 68 | 34 | 80 |
| C7 | 6000 | 105 | 2 | 115 | 29 | 88 |
| 9 | 17000 | 43 | 4 | 4 | 305 | 13 |
| 10 | 17500 | 45 | 3 | 2 | 320 | 12 |
| 11 | 35000 | 50 | 6 | 1 | 693 | 16 |
| 12 | 40000 | 48 | 5 | 0 | 877 | 12 |
| 13 | 42500 | 45 | 7 | 0 | 1031 | 13 |
| 14 | 16000 | 50 | 4 | 2 | 167 | 18 |

[1]data taken with Brookfield RVT, spindle #6, 20 rpm, except C4 measured at 5 rpm
[2]data taken with Bohlin CVO 120 rheometer, C25 Mooney-Couette geometry The complete disclosure of all patents, patent documents, and publications cited herein are incorporated be reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

We claim:

1. An aqueous adhesive composition comprising:
   20 to 75 wt % vinyl acetate polymer adhesive material, wherein the polymer adhesive material has a pH of less than 7;
   an acid swellable cationic thickener comprising at least one monomer unit selected from the group consisting of methacryloyloxyalkyl trialkyl ammonium salt, acryloyloxyalkyl trialkyl ammonium salt, and quaternized dialkylaminoalkylacrylamidine salt; and
   water;
   wherein, the aqueous adhesive composition has a stringing length of 9 cm or less, and a sag distance of 10 mm or less and an adhesive set time of 0 to 180 seconds.

2. An adhesive according to claim 1, wherein the polymer adhesive material has a pH of 6 or less.

3. An adhesive according to claim 1, wherein the polymer adhesive material has a pH of 5 or less.

4. An adhesive according to claim 1, wherein the aqueous adhesive composition has a phase lag of 45 degrees or less.

5. An adhesive according to claim 1, wherein the aqueous adhesive composition has a phase lag of 30 degrees or less.

6. An adhesive according to claim 1, wherein the aqueous adhesive composition has a sag distance of 3 mm or less.

7. An adhesive according to claim 1, wherein the aqueous adhesive composition has a viscosity of 3,000 to 100,000 cP.

8. An adhesive according to claim 1, wherein the aqueous adhesive composition has a set time 75 seconds or less.

9. An adhesive according to claim 1, wherein the aqueous adhesive composition has a complex shear modulus of 100 Pa or greater.

10. An adhesive according to claim 1, wherein the cationic thickener comprises a cationic associative polymeric thickener.

11. An aqueous adhesive composition comprising:
    50 to 75 wt % vinyl acetate polymer adhesive material, wherein the polymer adhesive material has a pH of less than 7;
    an acid swellable crosslinked cationic thickener comprising at least one monomer unit selected from the group consisting of methacryloyloxyalkyl trialkyl ammonium salt, acryloyloxyalkyl trialkyl ammonium salt, and quaternized dialkylaminoalkylacrylamidine salt; and
    water;
    wherein the adhesive composition has a phase lag of 30 degrees or less and an adhesive set time of 0 to 180 seconds.

12. An adhesive according to claim 11, wherein the aqueous adhesive composition has a sag distance of 10 mm or less.

13. An adhesive according to claim 11, wherein the aqueous adhesive composition has a stringing length of 9 cm or less.

14. An adhesive according to claim 11, wherein the cationic thickener comprises a cationic associative polymeric thickener.

15. An aqueous adhesive composition comprising:
    20 to 75 wt % vinyl acetate polymer adhesive material, wherein the polymer adhesive material has a pH of less than 7;
    an acid swellable crosslinked cationic thickener comprising at least one monomer unit selected from the group consisting of methacryloyloxyalkyl trialkyl ammonium salt, acryloyloxyalkyl trialkyl ammonium salt, and quaternized dialkylaminoalkylacrylamidine salt; and water;

wherein the adhesive composition has a phase lag of 45 degrees or less and a sag distance of 10 mm or less and an adhesive set time of 0 to 180 seconds.

16. An adhesive according to claim 15, wherein the aqueous adhesive composition has a sag distance of 3 mm or less.

17. An adhesive according to claim 15, wherein the aqueous adhesive composition has a stringing length of 9 cm or less.

18. An adhesive according to claim 15, wherein the cationic thickener comprises a cationic associative polymeric thickener.

19. An article comprising:

a dispenser container having a dispensing opening; and an aqueous adhesive composition according to claim 1 to 8 disposed within the dispenser container, the aqueous adhesive composition comprising:

50 to 75 wt % vinyl acetate polymer adhesive material, wherein the polymer adhesive material has a pH of less than 7;

an acid swellable cationic thickener; and water;

wherein, the aqueous adhesive composition has a stringing length of 9 cm or less and a sag distance of 10 mm or less and an adhesive set time of 0 to 180 seconds.

20. An article according to claim 19, wherein the dispenser opening has a cross-sectional area in a range of 0.2 to 50 mm$^2$.

21. An article comprising:

a dispenser container having a dispensing opening; and an aqueous adhesive composition disposed within the dispenser container, the aqueous adhesive composition comprising:

20 to 75 wt % vinyl acetate polymer adhesive material, wherein the polymer adhesive material has a pH of less than 7;

an acid swellable crosslinked cationic thickener comprising at least one monomer unit selected from the group consisting of methacryloyloxyalkyl trialkyl ammonium salt, acryloyloxyalkyl trialkyl ammonium salt, and quaternized dialkylaminoalkylacrylamidine salt; and water;

wherein, the aqueous adhesive composition has a phase lag of 30 degrees or less and an adhesive set time of 0 to 180 seconds.

22. An article according to claim 21, wherein the dispenser opening has a cross-sectional area in a range of 0.2 to 50 mm$^2$.

23. An adhesive according to claim 1, wherein the polymer adhesive material has a pH of 4 or less.

24. An adhesive according to claim 11, wherein the polymer adhesive material has a pH of 4 or less.

25. An adhesive according to claim 15, wherein the polymer adhesive material has a pH of 4 or less.

26. An article according to claim 19, wherein the polymer adhesive material has a pH of 4 or less.

27. An article according to claim 21, wherein the polymer adhesive material has a pH of 4 or less.

* * * * *

UNITED STATES PATENT AND TRADEMARK OFFICE
CERTIFICATE OF CORRECTION

Page 1 of 2

PATENT NO. : 7,851,522 B2
APPLICATION NO. : 11/265911
DATED : December 14, 2010
INVENTOR(S) : Cordell M Hardy It is certified that error appears in the above-identified patent and that said Letters Patent is hereby corrected as shown below:

Column 6
Line 21, delete "Masterisizer" and insert -- Mastersizer --, therefor.

Lines 30-31, delete "Masterisizer" and insert -- Mastersizer --, therefor.

Line 52, delete "Polyquatemium" and insert -- Polyquaternium --, therefor.

Line 56, delete "Polyquatemium" and insert -- Polyquaternium --, therefor.

Line 63, delete "Polyquatemium" and insert -- Polyquaternium --, therefor.

Column 7
Line 59, delete "$(CH_2)_r$," and insert -- $(CH_2)_n$ --, therefor.

Line 66, delete "Polyquatemium" and insert -- Polyquaternium --, therefor.

Column 8
Line 2, delete "Polyquatemium" and insert -- Polyquaternium --, therefor.

Line 20, delete "Polyquatemium" and insert -- Polyquaternium --, therefor.

Column 9
Lines 26 – 27, delete "sulphomethylated" and insert -- sulfomethylated --, therefor.

Line 54, delete "momomers" and insert -- monomers --, therefor.

Lines 55 – 56, delete "acryloyldimethyltuarate" and insert -- acryloyldimethyltaurate --, therefor.

Signed and Sealed this
Twelfth Day of February, 2013

Teresa Stanek Rea
*Acting Director of the United States Patent and Trademark Office*

CERTIFICATE OF CORRECTION (continued)
U.S. Pat. No. 7,851,522 B2

Column 13
Line 59 (approx.), delete "Sepigal™" and insert -- Sepigel™ --, therefor.